US010284833B2

(12) United States Patent
Kado

(10) Patent No.: US 10,284,833 B2
(45) Date of Patent: May 7, 2019

(54) IMAGE PROJECTION APPARATUS AND ASSOCIATED COOLING SYSTEM AND METHOD

(71) Applicant: Takahiro Kado, Kanagawa (JP)

(72) Inventor: Takahiro Kado, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/408,638

(22) Filed: Jan. 18, 2017

(65) Prior Publication Data

US 2017/0214897 A1    Jul. 27, 2017

(30) Foreign Application Priority Data

Jan. 25, 2016 (JP) ................................ 2016-011539

(51) Int. Cl.
G03B 21/16    (2006.01)
H04N 9/31    (2006.01)
G03B 21/20    (2006.01)

(52) U.S. Cl.
CPC ........... *H04N 9/3194* (2013.01); *G03B 21/16* (2013.01); *G03B 21/206* (2013.01); *H04N 9/3144* (2013.01); *H04N 9/3155* (2013.01); *H04N 9/3182* (2013.01)

(58) Field of Classification Search
USPC ......................................................... 353/52
See application file for complete search history.

(56) References Cited

U.S. PATENT DOCUMENTS

| 7,866,826 B2* | 1/2011 | Kobayashi | G03B 21/16 353/52 |
| 7,938,548 B2* | 5/2011 | Nozaki | G03B 21/28 315/219 |
| 7,954,956 B2* | 6/2011 | Nabeta | G03B 21/16 348/748 |
| 8,317,335 B2* | 11/2012 | Shiotsu | G03B 21/16 353/52 |
| 8,585,213 B2 | 11/2013 | Plut | |
| 9,674,494 B2* | 6/2017 | Terasaki | H04N 9/3144 |

(Continued)

FOREIGN PATENT DOCUMENTS

| CN | 102450021 A | 5/2012 |
| JP | 3471772 | 9/2003 |
| WO | WO 2014/155571 A1 | 10/2014 |

OTHER PUBLICATIONS

Chinese Office Action dated Jul. 3, 2018 for Chinese Application No. 201710058089.0, with English translation.

*Primary Examiner* — Jefferey F Harold
*Assistant Examiner* — Humam M Satti
(74) *Attorney, Agent, or Firm* — Oblon, McClelland, Maier & Neustadt, L.L.P.

(57) ABSTRACT

An image projection apparatus is configured to project an image onto a projection receiving part. The image projection apparatus includes: a light source; an optical modulator configured to form the image using light from the light source; a control unit configured to control the light source and the optical modulator; and a temperature detector configured to detect an environmental temperature. The control unit is configured to control at least one of the light source and the optical modulator to adjust color tone of the image depending on the environmental temperature detected by the temperature detector.

4 Claims, 10 Drawing Sheets

(56) References Cited

U.S. PATENT DOCUMENTS

| | | | |
|---|---|---|---|
| 2003/0020884 A1 | 1/2003 | Okada et al. | |
| 2003/0062545 A1* | 4/2003 | Yamazaki | G09G 3/2018 257/200 |
| 2008/0218458 A1* | 9/2008 | Endo | H04N 9/3111 345/83 |
| 2010/0302515 A1* | 12/2010 | Plut | H04N 9/3155 353/85 |
| 2012/0044280 A1* | 2/2012 | Nakayama | G03B 21/20 345/690 |
| 2012/0249976 A1* | 10/2012 | Shibasaki | H04N 9/3111 353/52 |
| 2014/0028986 A1 | 1/2014 | Plut | |
| 2014/0204132 A1* | 7/2014 | Akimoto | G09G 3/2022 345/691 |
| 2015/0015470 A1* | 1/2015 | Jiko | G09G 3/001 345/88 |
| 2016/0057398 A1 | 2/2016 | Kado | |
| 2016/0065844 A1* | 3/2016 | Yao | H04N 5/23241 348/207.11 |
| 2016/0100141 A1 | 4/2016 | Hosoi et al. | |
| 2016/0105652 A1* | 4/2016 | Yamashita | G03B 21/2053 348/333.1 |

* cited by examiner

FIRST PICTURE MODE: HIGH BRIGHTNESS MODE

SECOND PICTURE MODE: NATURAL MODE

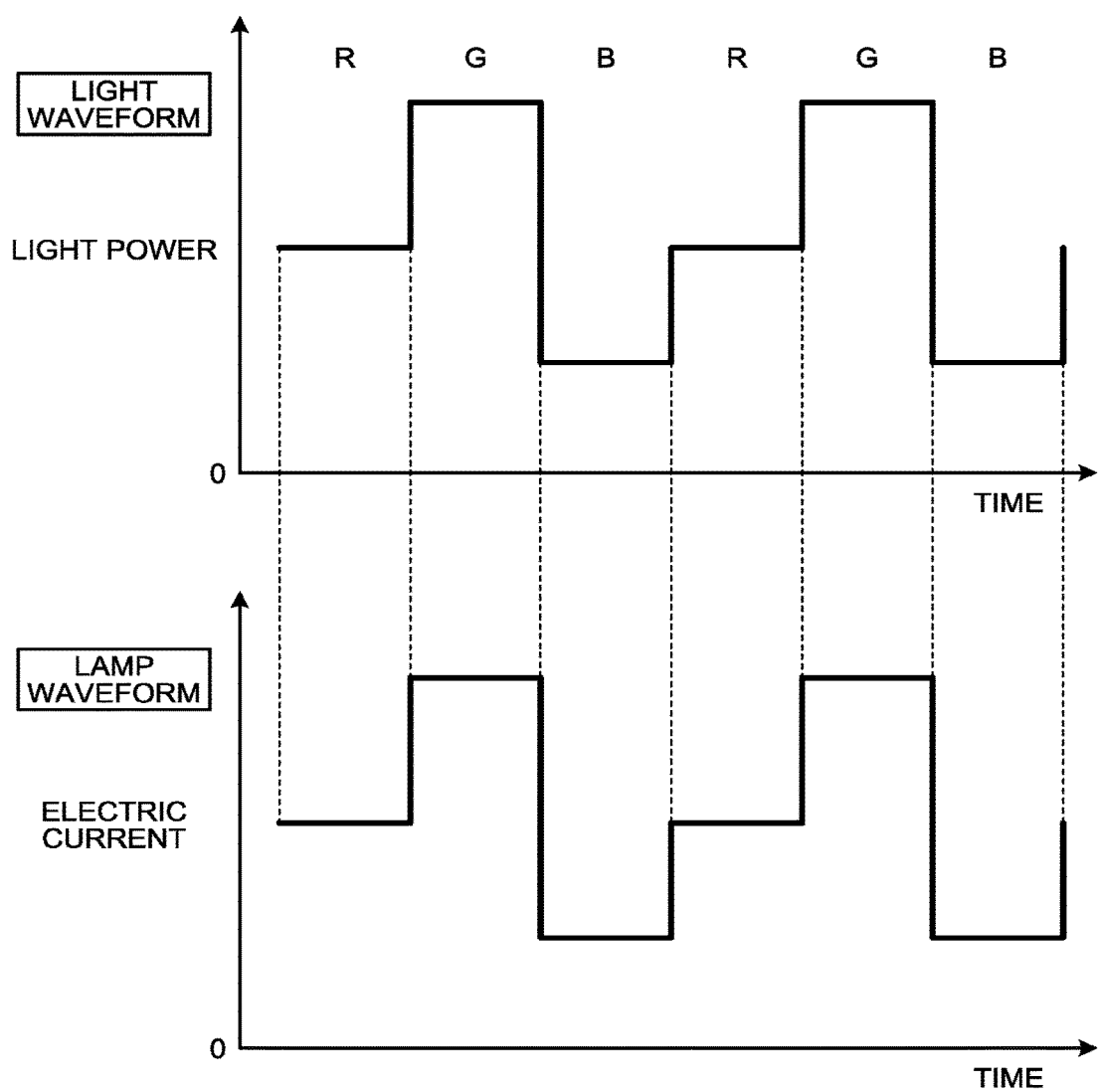

IMAGE PROJECTION APPARATUS AND ASSOCIATED COOLING SYSTEM AND METHOD

CROSS-REFERENCE TO RELATED APPLICATIONS

The present application claims priority under 35 U.S.C. § 119 to Japanese Patent Application No. 2016-011539, filed Jan. 25, 2016. The contents of which are incorporated herein by reference in their entirety.

BACKGROUND OF THE INVENTION

1. Field of the Invention

The present invention relates generally to image projection apparatuses.

2. Description of the Related Art

In recent years, DLP (Digital Light Processing) projectors that use DMDs (Digital Micro-mirror Devices) and LCD (Liquid Crystal Display) projectors that use transmissive liquid crystal are widespread as image projection apparatuses capable of displaying an image in an enlarged manner by projecting the image onto a projection receiving part, such as a screen; this is because these projectors are relatively inexpensive, light-weight, and compact.

Such a projector typically uses a discharge lamp, e.g., a high-pressure mercury lamp, or a semiconductor light source (solid-state light source), e.g., an LED (Light-Emitting Diode) or an LD (Laser Diode), as a light source. To suppress temperature rise of optical components, such as an internal lens, mirror, DMD, and liquid crystal, caused by heat and the like liberated from the light source, techniques of cooling inside the projector using a cooling fan or the like have been developed. An example of such a technique is disclosed in Japanese Patent No. 3471772.

Japanese Patent No. 3471772 discloses a projector-related method of detecting a rise in temperature of an optical component or ambient air temperature and, increasing the voltage applied to a cooling fan to increase rotational speed of the cooling fan when it is determined that a voltage applied to the fan can be increased but changing electric power supplied to a light source when it is determined that the applied voltage is at its upper limit, to maintaining a temperature of each part within the rating.

However, the technique disclosed in Japanese Patent No. 3471772 is disadvantageous in that changing the electric power supplied to the light source can undesirably lower brightness of an image projected by the projector. Hence, there is a need for developing a technique that enables efficient cooling while maintaining image brightness.

SUMMARY OF THE INVENTION

According to one aspect of the present invention, an image projection apparatus is configured to project an image onto a projection receiving part. The image projection apparatus includes a light source, an optical modulator, a control unit, and a temperature detector. The optical modulator is configured to form the image using light from the light source. The temperature detector is configured to detect an environmental temperature. The control unit is configured to control the light source and the optical modulator, and is configured to control at least one of the light source and the optical modulator to adjust color tone of the image depending on the environmental temperature detected by the temperature detector.

BRIEF DESCRIPTION OF THE DRAWINGS

FIG. 7 is a graph illustrating light waveform of the light source versus time and a diagram illustrating lamp waveform versus time when the picture mode is the high brightness mode;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
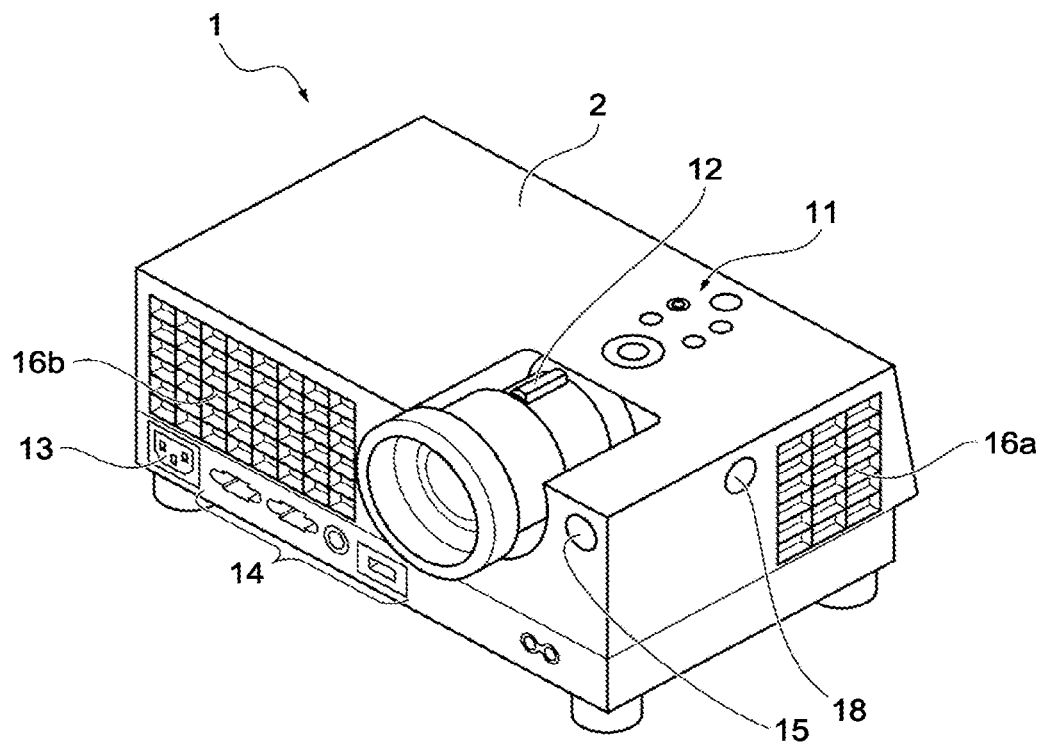
FIG. 1 is a perspective view illustrating appearance of a projector (image projection apparatus) according to a first embodiment of the present invention.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide an image projection apparatus capable of suppressing temperature rises of optical components while maintaining image brightness.

First Embodiment

Figure 2:
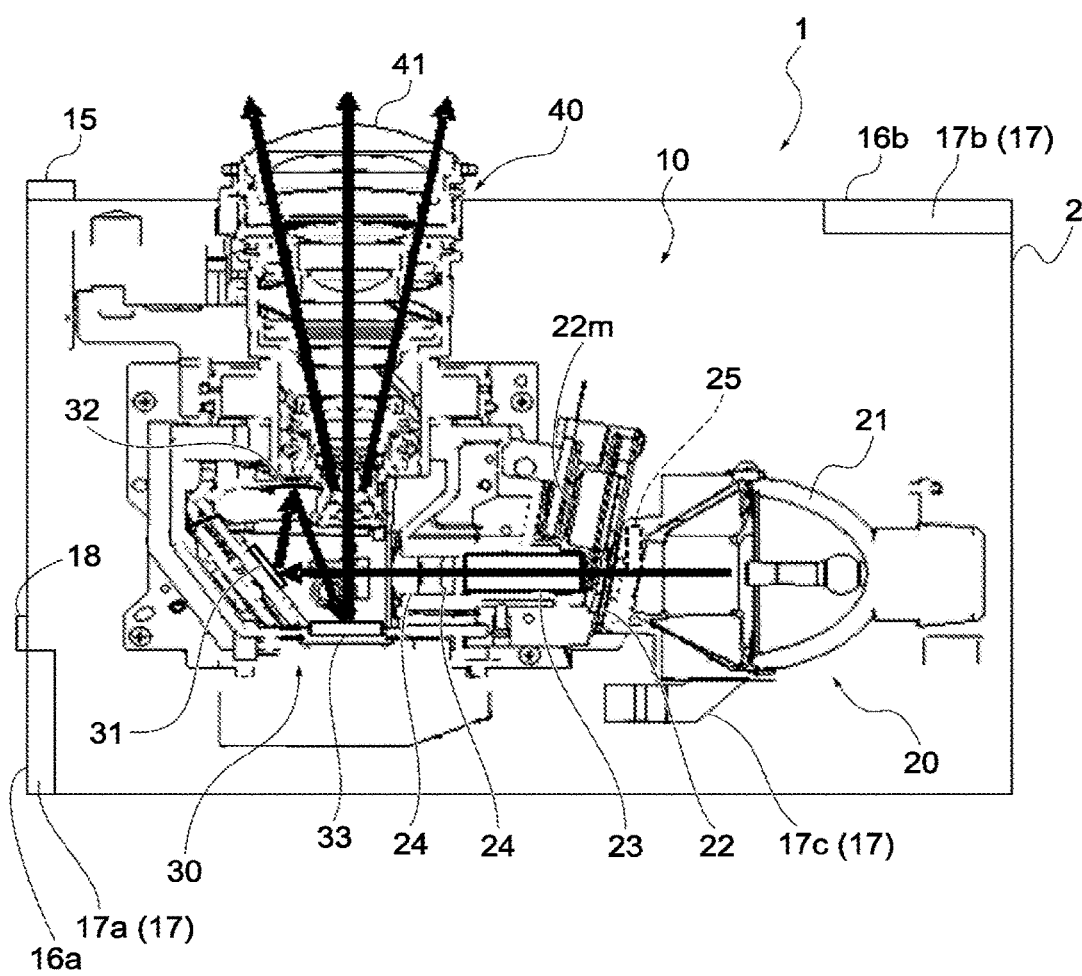
FIG. 2 is a cross-sectional view of an optical engine unit (an illumination optical unit, an optical modulation unit, and a projection unit) housed in the projector illustrated in FIG. 1.
Figure 3:
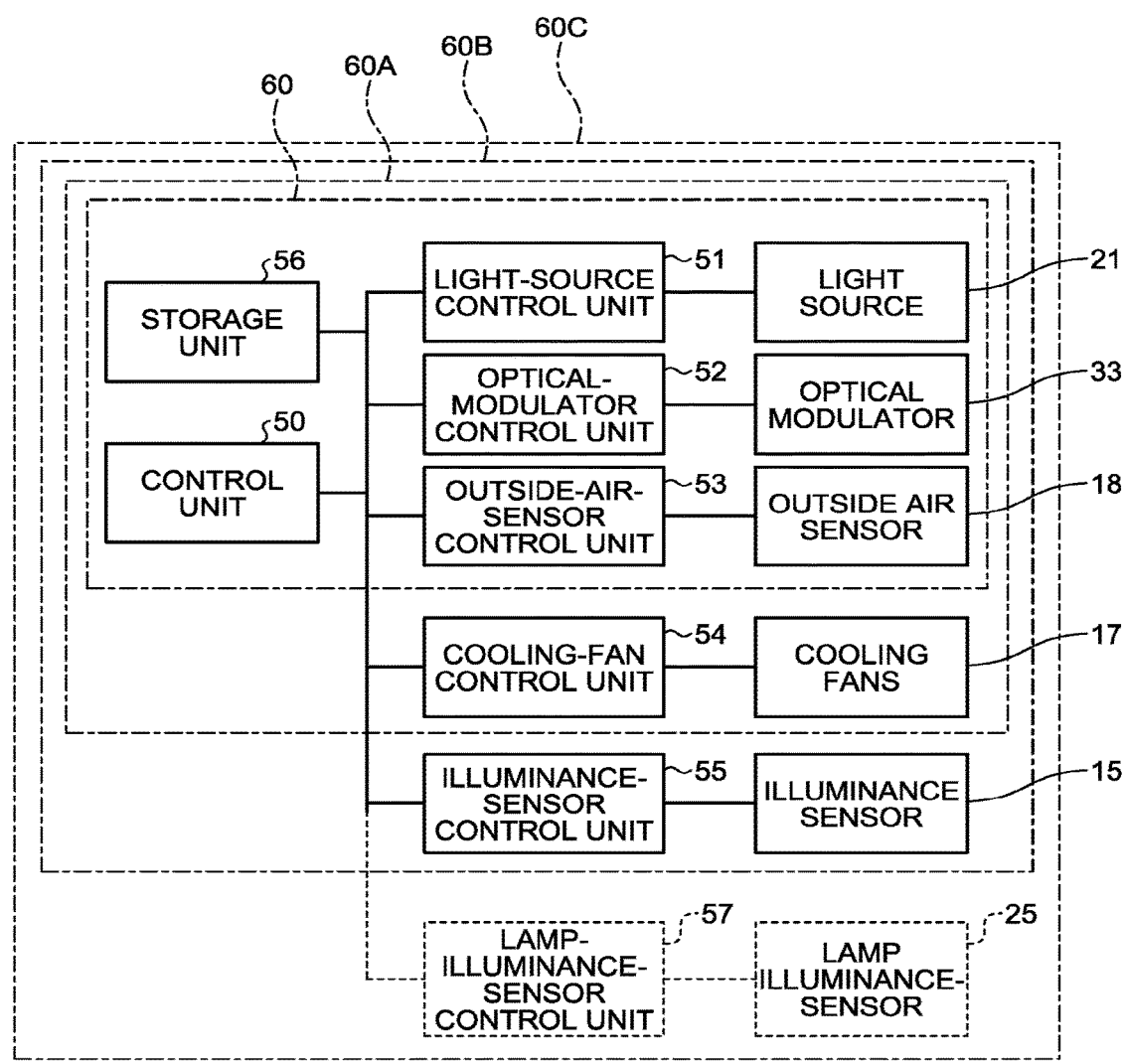
FIG. 3 is a block diagram illustrating example configurations of cooling control devices of the projector of the first embodiment and projectors of second to fifth embodiments.

A DLP projector 1 as one embodiment of an image projection apparatus according to the present invention is described below with reference to FIG. 1. FIG. 1 is a perspective view illustrating appearance of the projector 1 of the first embodiment of the present invention. FIG. 2 is a lateral cross-sectional view of an illumination optical unit 20, an optical modulation unit 30, and a projection optical unit 40 that make up an optical engine unit 10 inside the projector 1 illustrated in FIG. 1. FIG. 3 is a block diagram illustrating an example configuration of a cooling control device 60 of the projector 1.

As illustrated in FIG. 1 and FIG. 2, the projector 1 according to the first embodiment is covered by an outer cover (casing) 2 and internally includes the optical engine unit 10. An operating unit 11, which may include a power switch to be operated by a user and operating switches for use in operating the projector 1, is arranged on a top surface of the projector 1. The operating unit 11 further includes, as the operating switches, a switch for selecting an eco mode (low brightness mode), in which the projector 1 operates with reduced power consumption, and a picture-mode selection switch for selecting what may be referred to as a picture mode, in which color tone and brightness suitable for a projection image are set. In the first embodiment, as the picture mode, either a high brightness mode for projecting an image with bright color tone and high brightness or a natural mode for projecting an image with more natural color tone is selectable. As the picture mode, a movie mode suitable for movie watching, a sports mode suitable for sports watching, a cartoon mode suitable for cartoon watching, and the like may be provided.

A zoom lever 12 for use in enlarging/reducing a projection screen projected onto a projection receiving part, such as a screen, is also provided on the top surface of the projector 1.

An AC inlet 13 for supplying apparatus power, an external input terminal 14 for connection with external equipment, such as a personal computer and a video camera, a projection lens 41, from which light representing a projection image is to exit, an illuminance sensor 15, which is an illuminance detector that detects illuminance of an installation environment where the projector 1 is installed, and the like are provided on a front surface of the projector 1. The electric power supplied to a light source 21 is decreased when the installation environment is dark, and the electric power is increased when the installation environment is bright to adjust brightness of a projection image to enhance user visibility depending on the illuminance detected by the illuminance sensor 15.

An air inlet 16a and an air outlet 16b are provided in the casing 2. As illustrated in FIG. 2, an air suction fan 17a and an air exhaust fan 17b are provided inside the air inlet 16a and the air outlet 16b, respectively. Outside air sucked in through the air inlet 16a by the air suction fan 17a cools the light source and a driver circuit board, which are heat sources, while moving to the light source and the driver circuit board. Thereafter, the air is discharged through the air outlet 16b by the air exhaust fan 17b. A light-source cooling fan 17c that cools the light source is provided near the light source. Hereinafter, fans including the air suction fan 17a, the air exhaust fan 17b, and the light-source cooling fan 17c related to cooling are referred to as "the cooling fans 17". An outside air sensor 18, which is a temperature detector for measuring an ambient temperature (outside air temperature) of the installation environment where the projector 1 is installed, is arranged near the air inlet 16a. Rotational speeds of the cooling fans 17 are adjusted based on the outside air temperature detected by the outside air sensor 18 and a predetermined condition, thereby cooling the light source and the driver circuit board appropriately.

As illustrated in FIG. 2, the projector 1 includes, as the optical engine unit 10, the illumination optical unit (illumination optical system) 20 that guides light of the light source 21 to an optical modulator 33, the optical modulation unit 30 that forms an image using the light from the light source 21, and the projection optical unit (projection optical system) 40 that projects a projection image.

The illumination optical unit 20 includes the light source 21, a color wheel 22, a light tunnel 23, and a relay lens 24. Two lenses are combined to form the relay lens 24. The optical modulation unit 30 includes a flat mirror 31, a concave mirror 32, and the optical modulator 33. The projection optical unit 40 includes a fixed lens group arranged on a fixed lens barrel, a movable lens group arranged on a movable lens barrel, and the projection lens 41.

The projector 1 includes control devices that control operations of elements of the projector 1. As illustrated in FIG. 3, the projector 1 includes, as one of the control devices, a control unit 50 that controls operations of the elements of the projector 1 so that an image is formed from an input image signal (picture data) fed from an information processing apparatus, such as a personal computer, or an image capture apparatus, such as a video camera. The projector 1 includes, as the control devices, a light-source control unit 51 that performs on/off control of the light source 21, an optical-modulator control unit 52 that performs drive control of the optical modulator 33, an outside-air-sensor control unit 53 that controls the outside air sensor 18, a cooling-fan control unit 54 that controls the cooling fans 17, an illuminance-sensor control unit 55 that controls the illuminance sensor 15, and a storage unit 56 that are under control of the control unit 50.

In the first embodiment, as illustrated in FIG. 3, the control unit 50, the light source 21 and the light-source control unit 51, the optical modulator 33 and the optical-modulator control unit 52, the outside air sensor 18 and the outside-air-sensor control unit 53, and the storage unit 56 also function as the cooling control device 60 that suppresses excessive temperature rise of the optical engine unit 10 and the like of the projector 1. The cooling control device 60 performs a cooling control operation in accordance with a cooling control condition, such as a threshold value(s) and a sequential order, stored in the storage unit 56 in advance.

The control unit 50 includes, as its hardware components, a CPU (Central Processing Unit), a ROM (Read Only Memory), and a RAM (Random Access Memory). The control unit 50 controls operations of the elements of the projector 1 in accordance with program instructions stored in the ROM in advance using the RAM as a work memory.

Configurations and operations of the elements of the optical engine unit 10 are described in detail below. Examples of the light source 21 of the illumination optical unit 20 include a halogen lamp, a metal halide lamp, and a high-pressure mercury lamp. In the first embodiment, a high-pressure mercury lamp is used.

Figure 4:
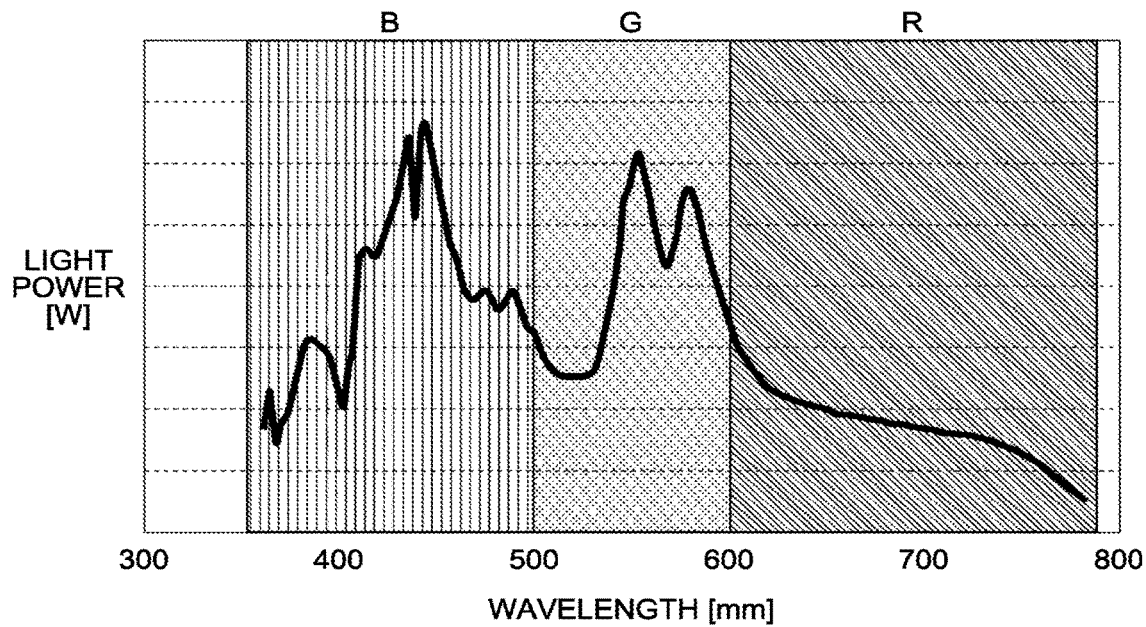
FIG. 4 is a graph illustrating an example of spectral power distribution of light emitted from a light source illustrated in FIG. 2.

FIG. 4 illustrates spectral power distribution of light of the high-pressure mercury lamp used as the light source 21. As illustrated in FIG. 4, light of a wavelength of approximately 500 nm or shorter is blue (B); light of a wavelength between 500 and 600 nm is green (G); light of a wavelength of 600 nm or longer is red (R). Due to the characteristics of High-pressure mercury lamp, a sharp peak is in each of the blue (B) and the green (G) but no large peak is in the red (R).

Figure 5A:
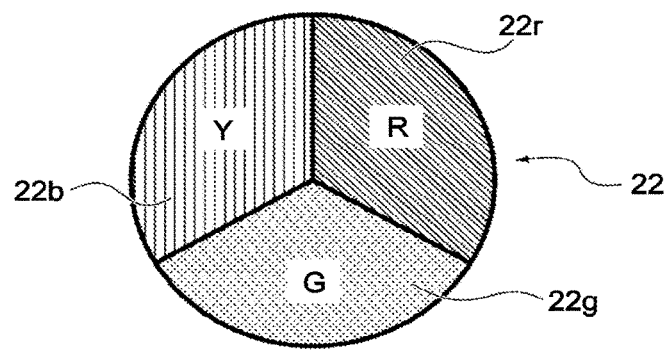
FIG. 5A is a plan view illustrating an example of a color wheel illustrated in FIG. 2.

By the control of the light-source control unit 51, white light emitted from the high-pressure mercury lamp used as the light source 21 is made to pass through the rotating disc-like color wheel 22 as illustrated by arrows in FIG. 2, and is thereby converted (filtered) into light, the color of which are repeatedly changed between the red (R), the green (G), and the blue (B) every unit time. As illustrated in FIG. 5A, the color wheel 22 having a disc-like shape is fixed to a motor shaft of a motor 22*m* and driven to rotate by the motor 22*m*. The color wheel 22 has, in its rotating direction, segments 22*r*, 22*g*, and 22*b*, which are red (R), green (G), and blue (B) filters.

The light of each color passing through the color wheel 22 is incident on the light tunnel 23. Plate glasses are joined together into a rectangular prism shape whose inner peripheral surfaces are mirror surfaces to form the light tunnel 23. The light of each color incident on the light tunnel 23 is reflected from the inner surfaces of the light tunnel 23 a plurality of times to be homogenized into a uniform light beam, which then exits the light tunnel 23 toward the relay lens 24, the light of each color is converged while the axial chromatic aberration is corrected during when transmitting through the relay lens 24, and guided to the optical modulation unit 30.

The light of each color guided by the relay lens 24 is reflected from the flat mirror 31 and the concave mirror 32 to be focused on an image forming surface of the optical modulator 33. In the first embodiment, a DMD is used as the optical modulator 33; however, the optical modulator 33 is not limited thereto.

The image forming surface of the optical modulator 33, which is the DMD, includes a substantially rectangular mirror surface formed by a plurality of movable micromirrors. The optical-modulator control unit 52 drives each of the micromirrors in a time division manner, thereby forming a predetermined image. More specifically, the flat mirror 31 and the concave mirror 32 reflect light from the light source 21 traveling in parallel with the image forming surface of the optical modulator 33 to direct the light toward the image forming surface, so that the image forming surface of the optical modulator 33 is irradiated with the light. The plurality of movable micromirrors are arranged in a grid on the image forming surface of the optical modulator 33. A mirror surface of each of the micromirrors of the optical modulator 33 can be tilted a predetermined angle on a diagonal hinge to be placed in any one two states: "ON" and "OFF".

When a micromirror is "ON", light from the illumination optical unit 20 is reflected from the micromirror toward the projection optical unit 40 and guided to the projection optical unit 40 as projection light. The projection light (projection image) is enlarged by passing through the plurality of lenses in the projection optical unit 40 and projected onto a screen through the projection lens 41 in an enlarged manner. On the other hand, when the micromirror is "OFF", light from the light source 21 is reflected from the micromirror toward a light sink held on a side surface of an illumination bracket or the like. The light reflected toward the light sink is absorbed as heat and cooled by an airflow produced by the air suction fan 17*a* and the air exhaust fan 17*b*.

As described above, it is possible to control projection light on a per-pixel basis in accordance with a modulation signal obtained by converting an input image signal to thereby individually drive the micromirrors to form an image.

The projection optical unit 40 projects image light reflected from the micromirrors of the optical modulator 33 onto the screen in an enlarged manner via the fixed lens group, the movable lens group, and the projection lens 41. The projection optical unit 40 includes, as the movable lens group, a focus-adjustment lens group that adjusts focal length when projecting an image onto the screen and a zoom-adjustment lens group that moves in conjunction with the above-described zoom lever 12 to adjust an angle of view when projecting the image. Focus adjustment can be performed by moving focus adjustment lenses by automatic control performed by the control unit 50 or in accordance with an operation performed using the operating unit 11. Zoom adjustment can be performed by moving the zoom-adjustment lens group in accordance with an operation performed using the zoom lever 12 or an operation performed using the operating unit 11.

The projector 1 of the first embodiment allows a user to select a desired picture mode by operating the picture-mode selection switch on the operating unit 11.

When the projector 1 continues image projection as described above, the temperature of the optical engine unit 10 increases due to light absorption, self-heating, and the like. Conventionally, cooling using the cooling fans 17 has been provided; however, when, for example, the outside air temperature is high, cooling provided only using the cooling fans 17 can be insufficient or power consumption and noise can undesirably increase. Switching to the eco mode to reduce power consumption will undesirably lower brightness of an image.

To avoid such undesirable situations, the projector 1 according to the first embodiment operates the elements of the cooling control device 60 depending on the outside air temperature to change the picture mode to perform the above-described cooling control of the projector 1. More specifically, the picture mode is switched from a high brightness mode to a natural mode when the outside air temperature detected by the outside air sensor 18 has exceeded a threshold value during operation in the high brightness mode, to suppress temperature rise.

Figure 6A:
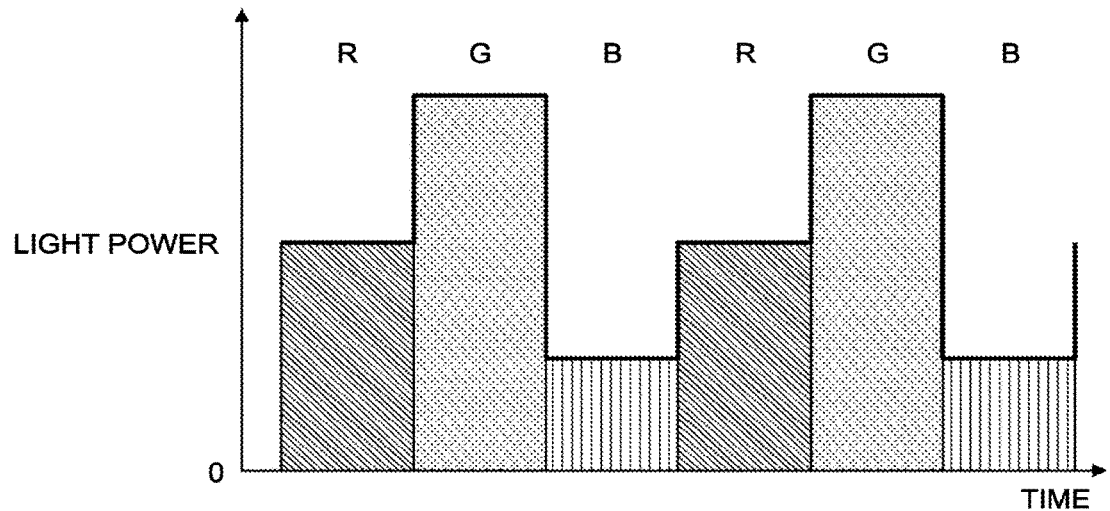
FIG. 6A is a graph illustrating light power of projection light of each color versus time when a picture mode is a high brightness mode.
Figure 6B:
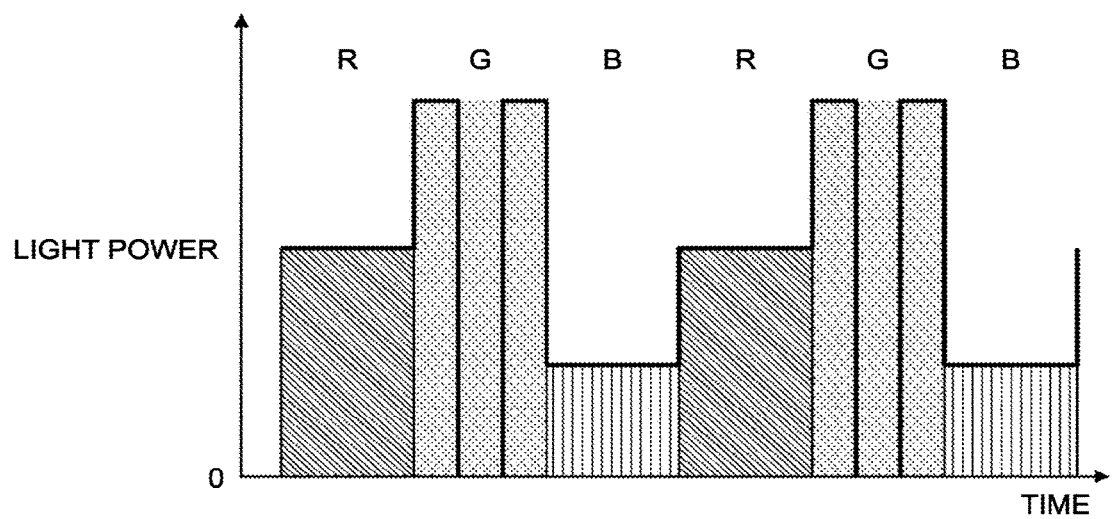
FIG. 6B is a graph illustrating light power of projection light of each color versus time when the picture mode is a natural mode.

How light power of projection light varies depending on the picture mode is described below with reference to the drawings. An example where the optical modulator 33 is controlled to adjust light power of projection light to change the picture mode is described first with reference to FIG. 6A and FIG. 6B. FIG. 6A and FIG. 6B depict projection light that varies depending on the picture mode. FIG. 6A is a diagram illustrating light power of projection light of each color versus time in the high brightness mode. FIG. 6B is a diagram illustrating light power of projection light of each color versus time in the natural mode. In FIG. 6A and FIG. 6B, the horizontal axis represents elapsed time, while the vertical axis represents light power of projection light color by color. In FIG. 6A and FIG. 6B, each hatched area represents the length of time for which the optical modulator 33 is irradiated with light of each color passing through the color wheel 22 and projected as projection light, and light power of the light. Each thick line portion represents the length of time for which the optical modulator 33 reflects the light of each color to guide the light to the projection optical unit 40 as projection light, and the light power of the light.

The projector 1 of the first embodiment is a DLP projector that uses the color wheel 22 including the segments 22*r*, 22*g*, and 22*b* for the respective three colors (R, G, and B) as illustrated in FIG. 6A to take out light of the colors in a time division manner, and irradiates the optical modulator 33 with the light. As described with reference to FIG. 4, light power varies from one color to another. For this reason, color of projection light produced by the optical modulator 33 varies with time, and light power also varies therewith.

As indicated by the hatched areas in FIG. 6A and FIG. 6B, among the light with which the optical modulator 33 is to be irradiated, the light power of the green (G) is the highest, the light power of the red (R) is the next highest, and the light power of the blue (B) is the lowest. The light-source control unit 51 controls light power of the light source 21 when the light source 21 is on so that light power exhibits such light power variation as described above.

In the high brightness mode, brightness is esteemed, and thus light of each color is guided to the projection optical unit 40 intentionally without cutting the light by the optical modulator 33. Accordingly, as indicated by the solid thick line in FIG. 6A, light power does not vary but is constant throughout a period when the light of the same color is projected.

By contrast, in the natural mode, color tone is esteemed, and thus light power of each color may be weakened by the optical modulator 33 for the purpose of balancing brightness of the colors. In the present embodiment, during a period (hereinafter, "G period") when the optical modulator 33 is irradiated with the green (G) light, as indicated by the thick solid line in FIG. 6B, the optical-modulator control unit 52 controls the optical modulator 33 such that the green (G) light is not guided (reflected) as projection light during a certain period (the period when the light power is zero in the G period illustrated in FIG. 6B). Specifically, the G period is divided into three sub-periods and control of sequentially turning on, off, and on the mirrors at sub-period intervals is performed.

This control reduces light power of the projection light of the green (G). Accordingly, light power of the projection light incident on any one of optical components downstream of the optical modulator 33 or, more specifically, the lenses and the lens barrels of the projection optical unit 40 downstream from the optical modulator 33, in the natural mode is lower than in the high brightness mode. As a result, an amount of temperature rise of the optical engine unit 10 decreases, and the internal apparatus temperature can be suppressed to its rating or lower.

In the example of FIG. 6B, the G period is divided into a first sub-period, a middle sub-period, and a last sub-period; and control of turning on, off, and on the mirrors of the optical modulator 33 is performed to make the middle sub-period of the G period a period during which the optical modulator 33 does not reflect the green (G) light. However, the present invention is not limited thereto. Alternatively, one of the first sub-period and the last sub-period may be set to the period during which the optical modulator 33 does not reflect the green (G) light. Further alternatively, a configuration, in which the G period is divided to more fine sub-periods and on-off switching of the mirrors is repeatedly performed at sub-period intervals, may be employed.

Figure 8:
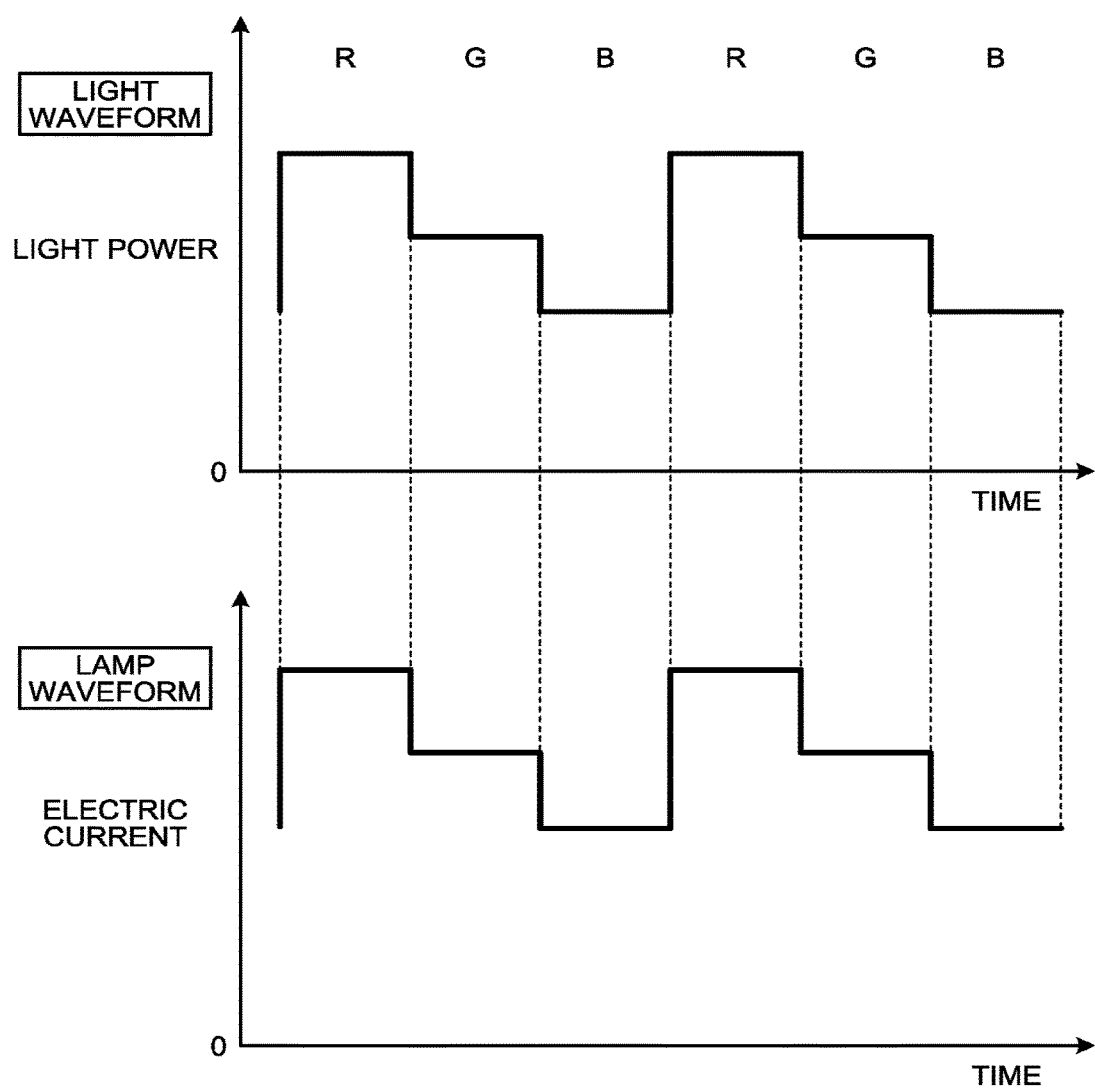
FIG. 8 is a graph illustrating light waveform of the light source versus time and a diagram illustrating lamp waveform versus time when the picture mode is the natural mode.

Changing the picture mode is not necessarily performed by controlling the optical modulator 33. As another embodiment, the picture mode may be changed by controlling, by the light-source control unit 51, the light source 21. An example of the other embodiment is described below with reference to FIG. 7 and FIG. 8. FIG. 7 is a graph illustrating light waveform of the light source (high-pressure mercury lamp) 21 versus time and a diagram illustrating lamp waveform versus time when the picture mode is the high brightness mode. FIG. 8 is a graph illustrating light waveform of the light source 21 versus time and a diagram illustrating lamp waveform versus time when the picture mode is the natural mode.

The upper diagram of each of FIG. 7 and FIG. 8 is the diagram illustrating light waveform versus time, where the horizontal axis represents elapsed time, while the vertical axis represents the light waveform (light power) of the light source 21 color by color. The lower diagram of each of FIG. 7 and FIG. 8 is the diagram illustrating lamp waveform versus time, where the horizontal axis represents elapsed time, while the vertical axis represents the lamp waveform (level of electric power) of the light source 21 color by color. The light waveforms indicate light power of each color corresponding to the time as in FIG. 6A and FIG. 6B. The lamp waveforms indicate how electric power supplied to the light source 21 varies. By varying the electric power from one color to another, light power of the colors is varied.

In the high brightness mode of FIG. 7, the electric power supplied to the light source 21 is increased when the segment 22g for green (G) of the color wheel 22 is positioned on an optical path, to increase light power of the green (G). By contrast, in the natural mode of FIG. 8, the electric power supplied to the light source 21 is increased when the segment 22r for red (R) of the color wheel 22 is positioned on the optical path, to increase light power of the red (R). The electric power supplied to the light source 21 is reduced stepwise when the segments 22g and 22b for green (G) and blue (B) are positioned on the optical path.

As described with reference to FIG. 4, due to the characteristics of the light source 21 includes the high-pressure mercury lamp, a sharp peak is in the wavelength range of the blue (B) and the wavelength range of the green but no large peak is in the wavelength range of the red (R). Therefore, as described in the high brightness mode with reference to FIG. 7, if the lamp waveform is manipulated to increase increasing light power of the green (G), the peak level of the green (G) light is further increased. As a result, total light power of light of the respective colors incident on the optical components downstream of the color wheel 22 or, more specifically, optical members of the optical modulation unit 30 and the projection optical unit 40 downstream from the optical modulator 33, increases, undesirably resulting in temperature rise.

By contrast, when the lamp waveform is manipulated to increase light power of the red (R) as in the natural mode of FIG. 8, because light power of the red (R) is originally not high, the amount of increase in total light power of the light is smaller than when light power of the green (G) is increased in the high brightness mode as illustrated in FIG. 7. Accordingly, the amount of temperature rise of the optical components downstream of the color wheel 22 can be reduced by controlling, by the light-source control unit 51, electric power supplied to the light source 21 to change the lamp waveform from the lamp waveform in the high brightness mode of FIG. 7 to the lamp waveform in the natural mode of FIG. 8 when the outside air temperature has exceeded the threshold value during image projection in the high brightness mode.

Figure 9:
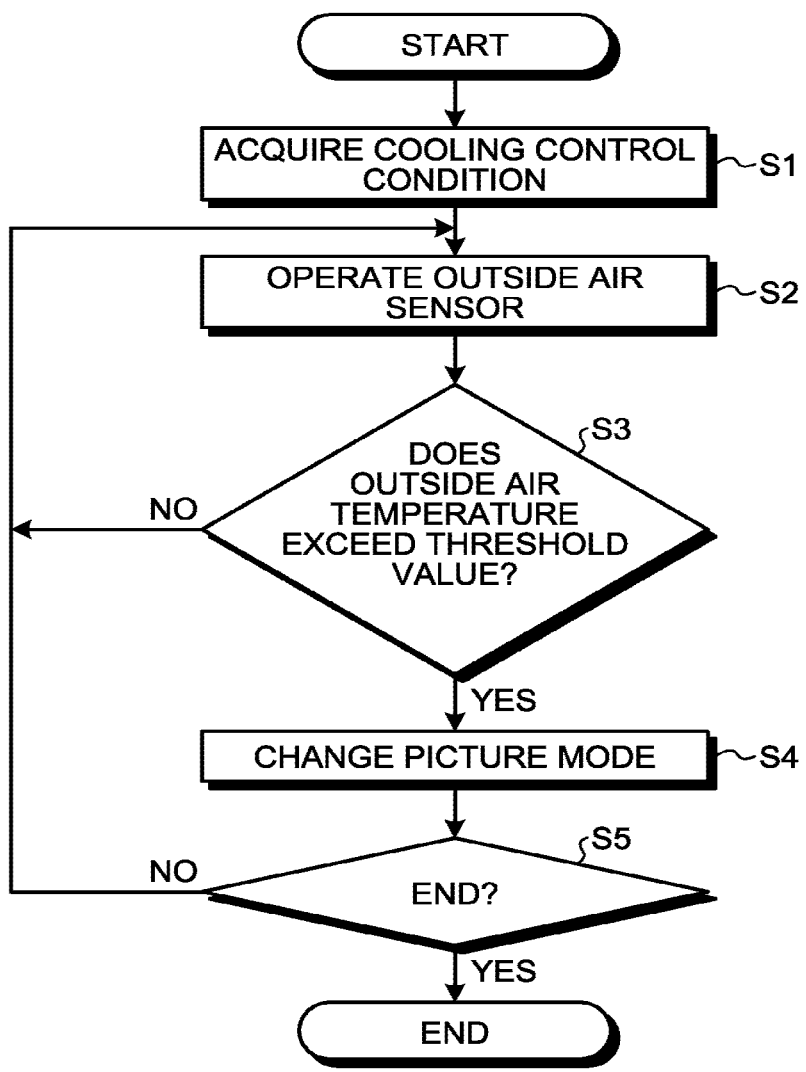
FIG. 9 is a flowchart illustrating an example of a cooling control operation performed in the projector of the first embodiment.

An example of a procedure for a cooling control method performed by the cooling control device 60 is described below with reference to the flowchart of FIG. 9.

Upon being started by a user, the projector 1 starts image projection in the high brightness mode (standard mode). When the projector 1 is thus started, the control unit 50 reads out a cooling control condition for operating the cooling control device 60 from the storage unit 56 (S1). The cooling control condition may be stored in the storage unit 56 in advance as initial values prior to shipment or the like and/or may be configurable by a user using the operating unit 11 or the like. In the first embodiment, a threshold value of the installation environment temperature (outside air temperature) for switching the picture mode to the natural mode is set in advance.

Next, the outside-air-sensor control unit 53 causes the outside air sensor 18 to operate to measure the outside air temperature (S2). This measurement of the outside air temperature is constantly performed during a period when the projector 1 is operating. The measured outside air temperature is sent to the control unit 50. The control unit 50 determines whether the outside air temperature exceeds the threshold value (S3). When the outside air temperature is equal to or lower than the threshold value (NO at S3), because cooling control is currently unnecessary, processing returns to S2 to continue measuring (monitoring) the outside air temperature.

On the other hand, when the outside air temperature has exceeded the threshold value (YES at S3), a picture-mode change process is performed in the above-described manner (S4) to change the picture mode from the high brightness mode to the natural mode. Although changing the picture mode changes color tone of a projection image, because brightness of the projection image can be maintained while reducing light power of the green (G) and the blue (B), temperature rise of the projector 1 can be suppressed. Accordingly, the projector 1 can continue projection with favorable visibility and high image quality. Furthermore, changing the picture mode allows the user to notice that the temperature of the environment where the projector 1 is used is high and take a measure to lower the outside air temperature by, e.g., adjusting temperature of an air conditioner. As a result, the projector 1 can be used in a more suitable environment.

Thereafter, when projection by the projector 1 has ended (YES at S5), the cooling control process also ends. When projection continues (NO at S5), processing returns to S2 to continue measuring the outside air temperature and performing the subsequent steps, so that the cooling control process can be continuously performed to suppress temperature rise during a period when the projector 1 is operating.

The cooling control method may include, in addition to the above-described steps, processing of returning the picture mode to the high brightness mode when the outside air temperature has dropped to the threshold value or lower or to a second threshold value, which is lower than the threshold value, at S2. Thereby, projection in the standard, high brightness mode becomes possible.

As described above, the projector 1 of the first embodiment and its modification controls reflection of light at the optical modulator 33 or controls the lamp waveform of the light source 21 when the outside air temperature exceeds the threshold value, to change the picture mode to suppress temperature rise of the optical engine unit 10. Accordingly, the projector 1 that is capable of suppressing temperature rise while maintaining brightness of a projection image, thereby achieving projection with high image quality can be provided. Furthermore, because sufficient cooling (suppressing temperature rise) can be provided by changing the picture mode, noise suppression, reduction in power consumption, and the like can also be achieved by suppressing increase of rotation of the cooling fans 17.

Figure 5B:
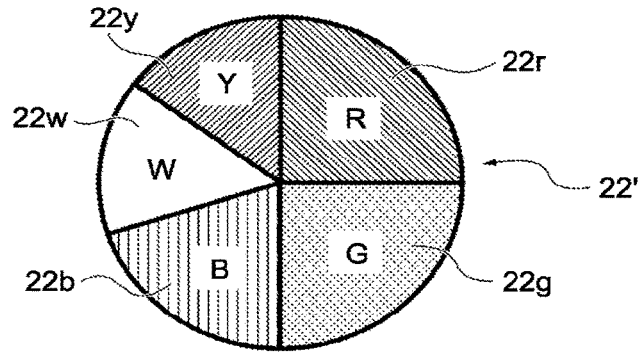
FIG. 5B is a plan view illustrating another example of the color wheel.

Although the color wheel 22 including the segments 22r, 22g, and 22b for the three colors (RGB) as illustrated in FIG. 5A is used in the projector 1 of the first embodiment and the other embodiments described below, the present invention is not limited to this configuration. As another embodiment, a color wheel 22' including, in addition to the segments 22r, 22g, and 22b for RGB, a segment 22w for white (W) and a segment 22y for yellow (Y) as illustrated in FIG. 5B may be used. Even with this configuration, as in the case described above, increasing electric power supplied to the light source 21 when the segment 22w for white (W) or the segment 22y for yellow (Y) of the color wheel 22' is on the optical path increases total light power of light, resulting in increases in temperatures of the downstream optical components. Hence, by decreasing electric power supplied to the light source 21 when the segment 22w for white (W) or the segment 22y for yellow (Y) is on the optical path, total light power of the light can be reduced and, as a result, suppressing temperature rise of the optical components while maintaining brightness of a projection image can be achieved.

Another control method of controlling, when the optical modulator 33 is irradiated with white (W) light or yellow (Y) light because the segment 22w for white (W) or the segment 22y for yellow (Y) is on the optical path, the optical modulator 33 so that the light is not reflected therefrom for a predetermined period may be employed. Also with this control method, suppressing temperature rise of the optical components while maintaining brightness of a projection image can be achieved.

Second Embodiment

The projector 1 according to a second embodiment of the present invention is identical in basic configuration to the projector 1 of the first embodiment except for including a cooling control device 60A illustrated in FIG. 3 in lieu of the cooling control device 60. The cooling control device 60A of the second embodiment includes the control unit 50, the light source 21 and the light-source control unit 51, the optical modulator 33 and the optical-modulator control unit 52, the outside air sensor 18 and the outside-air-sensor control unit 53, the cooling fans 17 and the cooling-fan control unit 54, and the storage unit 56. A cooling-control condition table, in which a cooling control condition, such as a threshold value(s) of the outside air temperature, a cooling process(es) to be performed, and an order of performing the cooling processes, is configured in advance, is stored in the storage unit 56.

The cooling control device 60A of the second embodiment selects any one of cooling processes (temperature-rise suppressing processes), which are a cooling process by changing the picture mode, a cooling process by controlling rotation of the cooling fans 17, and a cooling process by controlling electric power supplied to the light source 21, so that optimum cooling control can be performed based on a cooling condition under control the control unit 50. An example of the cooling-control condition table is presented in Table 1 below. Threshold values of the outside air temperature each for performing a corresponding one of the cooling processes are set in the cooling-control condition table of Table 1 below.

TABLE 1

| No. | Outside Air Temperature (Threshold Value) | Cooling Control Process |
| --- | --- | --- |
| 1 | α° C. | changing picture mode |
| 2 | β° C. | controlling cooling fans |
| 3 | γ° C. | controlling light source |

Figure 10:
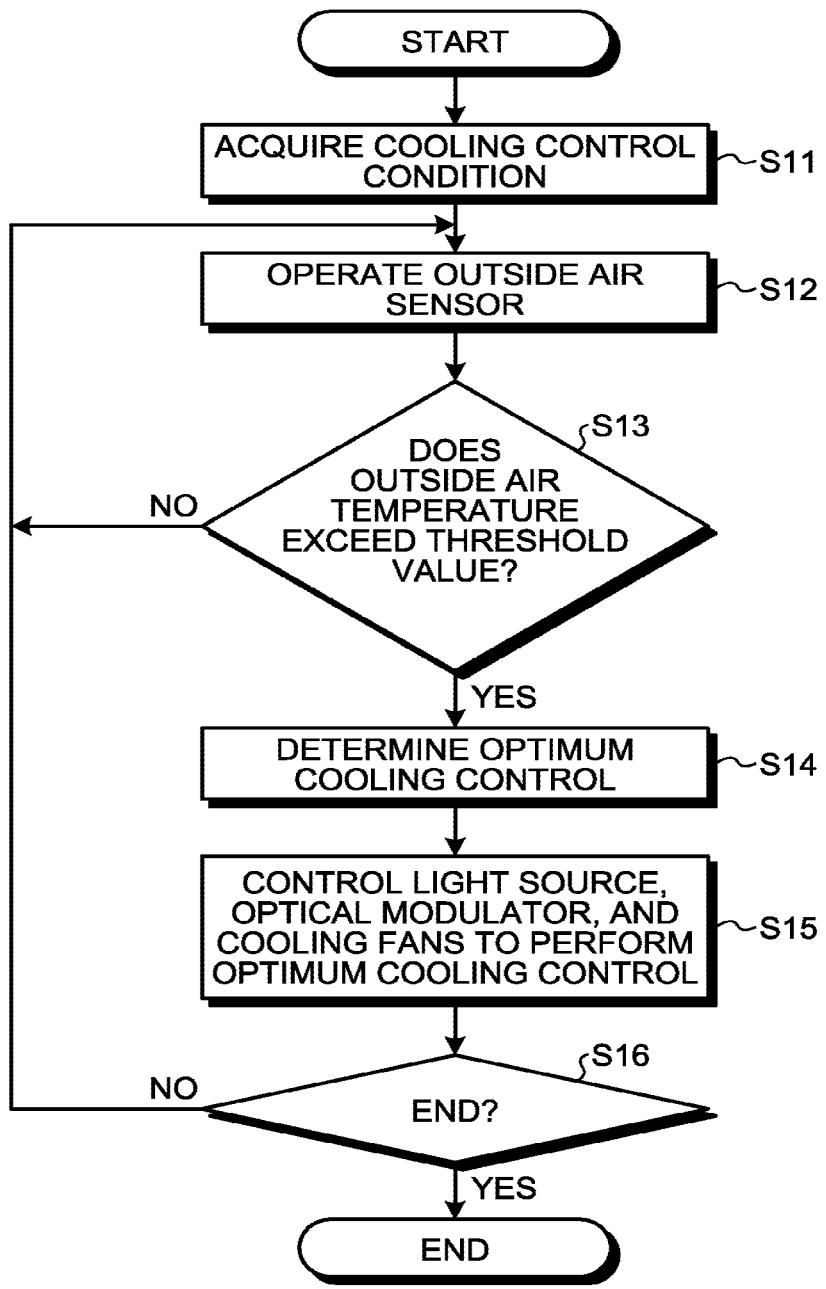
FIG. 10 is a flowchart illustrating an example of a cooling control operation performed in the projector of the second embodiment.

An example of a procedure for a cooling control method performed by the cooling control device 60A is described below with reference to the flowchart of FIG. 10. Upon being started, the projector 1 starts image projection in the high brightness mode. At this time, the control unit 50 reads out the cooling-control condition table from the storage unit 56 to acquire the cooling control condition (S11).

Next, the outside air sensor 18 is operated to measure the outside air temperature (S12). Determination as to whether or not the outside air temperature has exceeded each of the threshold values in the cooling-control condition table is made (S13). For example, the determination may be made by determining whether the outside air temperature has exceeded the lowest one of the threshold values ($\alpha°$ C., $\beta°$ C., and $Y°$ C.) presented in Table 1. When the outside air temperature is equal to or lower than the threshold value (NO at S13), processing returns to S12 to measure (monitor) the outside air temperature.

On the other hand, when the outside air temperature has exceeded the threshold value (YES at S13), processing proceeds to S14, where an optimum one of the cooling processes is selected depending on the outside air temperature. In the second embodiment, when the outside air temperature is $\alpha°$ C., changing the picture mode is selected; when the outside air temperature is $\beta°$ C., controlling rotation of the cooling fans 17 is selected; when the outside air temperature is $Y°$ C., controlling the light source 21 is selected.

Next, at S15, one of the light-source control unit 51, the optical-modulator control unit 52, and the cooling-fan control unit 54 controls the corresponding one of the light source 21, the optical modulator 33, and the cooling fans 17 to perform the optimum cooling process selected at S14. When changing the picture mode is to be performed, as in the first embodiment, reflection of light at the optical modulator 33 is controlled by the optical-modulator control unit 52, or lamp waveform of the light source 21 is controlled by the light-source control unit 51, to change the picture mode from the high brightness mode to the natural mode. As a result, temperature rise of the optical engine unit 10 can be suppressed.

When controlling the cooling fans 17 is to be performed, the cooling-fan control unit 54 performs control of increasing electric power supplied to the cooling fans 17. With this control, rotational speeds of the cooling fans 17 (the air suction fan 17a, the air exhaust fan 17b, and the light-source cooling fan 17c) are increased and flow of the outside air inside the casing 2 is enhanced. As a result, temperature rise of the optical engine unit 10 can be suppressed.

When controlling the light source 21 is to be performed, the light-source control unit 51 decreases electric power supplied to the light source 21, thereby reducing light power. In this case, in contrast to changing the picture mode where the electric power supplied to the light source 21 is varied from one color to another, light power is entirely reduced. As a result, because total light power of light of the respective colors, with which the optical components downstream of the light source 21 are irradiated, decreases, suppression in temperature rise of the optical engine unit 10 can be achieved.

Thereafter, when projection by the projector 1 has ended (YES at S16), the cooling control process also ends. When projection continues (NO at S16), processing returns to S12 to continue measuring the outside air temperature and performing the subsequent steps, so that the cooling control process can be continuously performed to suppress temperature rise during a period when the projector 1 is operating.

Further, also in the second embodiment, bringing the picture mode back to the high brightness mode, stopping or reducing the rotational speeds of the cooling fans 17, and increasing the electric power supplied to the light source 21 may be performed when the outside air temperature has dropped to the threshold value or lower. Thereby, it becomes possible to suppress unnecessary operation of the cooling control device 60A and perform cooling control more efficiently.

Because an optimum cooling process can be selected and performed depending on the outside air temperature, the second embodiment allows selecting and performing not one but two or more of the three cooling processes. For example, performing two of the processes simultaneously depending on an environmental condition, such as the outside air temperature, can provide more effective cooling. In a situation where projection has already been performed in the natural mode in accordance with a user's selection or the like, controlling the cooling fans 17 or controlling the light source 21 is selectable. In a situation where brightness of a projection image is lower than usual because the eco mode (low brightness mode) has been selected, controlling the cooling fans 17 is selectable.

Although selection from the three cooling processes is made in the above description, the three cooling processes may be sequentially performed responsive to changes in the outside air temperature or the like. For example, the cooling processes may be performed as follows. When the outside air temperature has exceeded a threshold value, the picture mode is changed first. As a result, image brightness can be maintained and temperature rise can be reduced while reducing increase in noise and power consumption. Thereafter, when the state where the outside air temperature exceeds the threshold value continues for a predetermined duration or when an internal apparatus temperature obtained through measurement has exceeded a threshold value, the cooling fans 17 is activated or the rotational speeds of the cooling fans 17 is increased to provide cooling. Furthermore, when the outside air temperature continues exceeding the threshold value for a long duration or when the internal apparatus temperature continues exceeding the threshold value for a long duration, electric power supplied to the light source 21 is entirely reduced to reduce light power, thereby suppressing temperature rise of the optical components. By providing cooling in this manner, temperature rise can be suppressed more efficiently.

Controlling electric power supplied to the light source 21 lowers brightness of a projection image; however, because a user can notice that a large load is placed on the projector 1, the user can take a measure, such as lowering the outside air temperature, and turning off the power supply to the projector 1 and re-starting the projector 1 after the internal apparatus temperature has dropped sufficiently. Accordingly, excessive temperature rise can be suppressed and, simultaneously, durability of components of the projector 1 can be increased. Furthermore, because controlling electric power supplied to the light source 21 is performed last, decrease in brightness of a projection image occurs last.

An order of performing the three processes can be determined in advance according to a user's preference, specification of the projector 1, and the like and stored in the cooling-control condition table. For example, when changing the picture mode is performed prior to controlling electric power supplied to the light source 21, a user can use a bright projection image. This order is suitable for a case where higher priority is placed on brightness than on color tone. By contrast, when higher priority is placed on color tone than on brightness, controlling electric power supplied to the light source 21 is preferably performed prior to changing the picture mode so that a user can use a projection image that is reduced in brightness but retains its color tone. When it is desired to maintain both color tone and brightness, controlling rotation of the cooling fans 17 is preferably performed prior to changing the picture mode and controlling electric power supplied to the light source 21 so that a user can use a projection image that remains at the same brightness and color tone with cooling provided efficiently.

Furthermore, changes in the outside air temperature may preferably be monitored to cause the order and/or timing of performing the cooling processes to vary between when the outside air temperature is increasing and when the same is decreasing. For example, control may be performed as follows. A threshold value of the outside air temperature for a case where the outside air temperature is increasing is set to a relatively high value, while a threshold value for a case where the outside air temperature is decreasing is set to a relatively low value. A threshold value for a case where the outside air temperature is fluctuating near the threshold value is set to a still higher value. When such control is performed, because an undesirable situation that the picture mode is changed frequently, the cooling process is switched frequently, or brightness of an image changes frequently is less likely to occur, a user's comfort in using the projector 1 can be increased.

As described above, the projector 1 of the second embodiment is also capable of suppressing temperature rise while maintaining brightness of a projection image, thereby achieving projection with high image quality. Furthermore, the projector 1 can perform cooling control suitable for an installation environment, a user's usage status, specification of the projector 1, and the like.

Third Embodiment

The projector 1 according to a third embodiment of the present invention is identical in basic configuration to the projector 1 of the first embodiment except for including a cooling control device 60B illustrated in FIG. 3 in lieu of the cooling control device 60. The cooling control device 60B of the third embodiment includes the control unit 50, the light source 21 and the light-source control unit 51, the optical modulator 33 and the optical-modulator control unit 52, the outside air sensor 18 and the outside-air-sensor control unit 53, the cooling fans 17 and the cooling-fan control unit 54, the illuminance sensor 15 and the illuminance-sensor control unit 55, and the storage unit 56.

In the projector 1 of the third embodiment, as in the projector 1 of the first, second embodiment, the cooling control device 60B performs changing the picture mode, controlling rotation of the cooling fans 17, and controlling electric power supplied to the light source 21 in accordance with a cooling control condition, such as an outside air temperature, stored in the storage unit 56, thereby suppressing temperature rise of the projector 1. The third embodiment is further configured not to perform, even when the outside air temperature has exceeded a threshold value, changing the picture mode if electric power supplied to the light source 21 has been decreased sufficiently in accordance with the illuminance detected by the illuminance sensor 15. This is because, because the electric power is low, even when the outside air temperature is high, the temperature of the optical engine unit 10 is less likely to increase and therefore it is unnecessary to change the picture mode. Although controlling electric power supplied to the light source 21 lowers brightness of a projection image, because the installation environment is also dark, sufficient brightness for a user to view the projection image can be ensured.

Fourth Embodiment

The projector 1 according to a fourth embodiment of the present invention is identical in basic configuration to the projector 1 of the first embodiment except for including a cooling control device 60C illustrated in FIG. 3 in lieu of the cooling control device 60 and further including, as a light-source illuminance detector, a lamp illuminance sensor 25 and a lamp-illuminance-sensor control unit 57. The cooling control device 60C of the fourth embodiment includes the control unit 50, the light source 21 and the light-source control unit 51, the optical modulator 33 and the optical-modulator control unit 52, the outside air sensor 18 and the outside-air-sensor control unit 53, the cooling fans 17 and the cooling-fan control unit 54, the illuminance sensor 15 and the illuminance-sensor control unit 55, the lamp illuminance sensor 25 and the lamp-illuminance-sensor control unit 57, and the storage unit 56.

In the projector 1 of the fourth embodiment, as in each of the above-described embodiments, the cooling process by changing the picture mode, the cooling process by controlling the cooling fans 17, and the cooling process by controlling electric power supplied to the light source 21, are performed as required depending on the outside air temperature or the like, thereby suppressing temperature rise.

In the fourth embodiment, under control of the lamp-illuminance-sensor control unit 57, the lamp illuminance sensor 25 detects illuminance of the light source 21. Brightness (illuminance) of the light source 21 can drop when the light source 21 is degraded by long-term use or the like. When, in such a condition, the picture mode is changed to the natural mode or electric power supplied to the light source 21 is reduced, visibility of a projection image will disadvantageously decrease. However, in the fourth embodiment, the control unit 50 controls related units so as not to perform changing the picture mode or controlling electric power supplied to the light source 21 when illuminance detected by the lamp illuminance sensor 25 has dropped to a certain level or lower or, more specifically, when the illuminance has dropped to a threshold value or lower.

By performing such control as described, more-than-necessary decrease in brightness of a projection image can be suppressed. Furthermore, because light power of the light source 21 is low, the temperature of the optical engine unit 10 can be maintained within its rating without performing changing the picture mode and the like and, accordingly, temperature rise can be suppressed. When a need for cooling is caused by a large temperature rise of the outside air temperature or the like, temperature rise of the projector 1 can be suppressed by controlling rotation of the cooling fans 17 to provide cooling.

Although an example where the present invention is applied to the DLP projector 1, which is an example of image projection apparatus, is described in each of the embodiments, the present invention is not limited thereto, and the known 3LCD system can be used.

Fifth Embodiment

Figure 11:
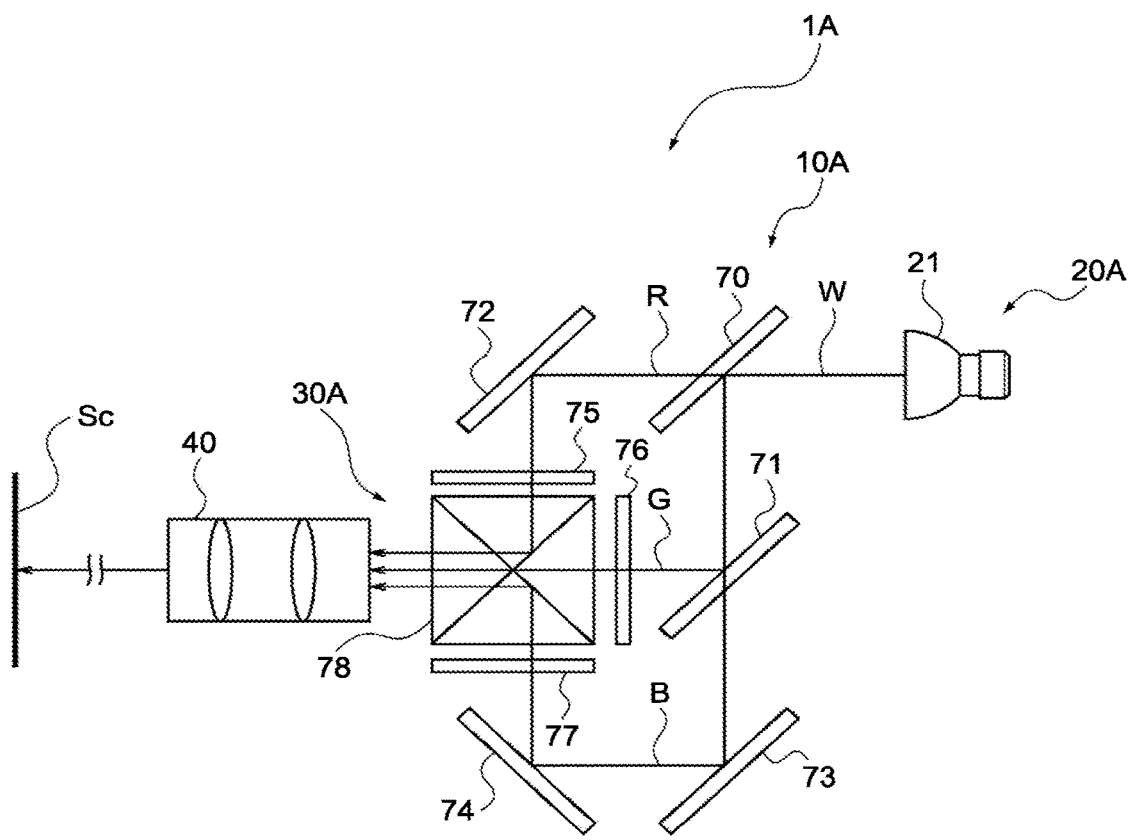
FIG. 11 is an optical diagram of an optical engine unit of the projector of the fifth embodiment.

A 3LCD projector 1A of a fifth embodiment of the present invention is described below with reference to FIG. 11. FIG. 11 is an optical diagram of an optical engine unit 10A of the projector 1A of the fifth embodiment. The projector 1A of the fifth embodiment is similar in basic configuration to the projector 1 of the first embodiment except for including the optical engine unit 10A illustrated in FIG. 11. The optical engine unit 10A of the fifth embodiment includes an illumination optical unit 20A, an optical modulation unit 30A, and the projection optical unit 40. The illumination optical unit 20A includes the light source 21, dichroic mirrors 70 and 71, and reflecting mirrors 72, 73, and 74. The optical modulation unit 30A includes, as an optical modulator, liquid crystal displays (LCDs) 75, 76, and 77 of a three-panel design, and a cross dichroic prism 78. The projector 1A includes the cooling control device 60 that is similar to the cooling control device 60 of the first embodiment; however, the optical-modulator control unit 52 illustrated in FIG. 3 performs drive control of the liquid crystal displays (LCDs) 75, 76, and 77 serving as the optical modulator. The projector 1A may include, in lieu of the cooling control device 60, the cooling control device 60A, 60B, or 60C.

In the projector 1A of the fifth embodiment having the above-described configuration, white (W) light emitted from the light source 21 is incident on the dichroic mirror 70 that is arranged on an optical path of the white (W) light. Only the red (R) light is transmitted through the dichroic mirror 70, guided to the reflecting mirror 72, reflected from the reflecting mirror 72, and then illuminates the liquid crystal display 75.

The light other than the red (R) is reflected from the dichroic mirror 70 and thereafter incident on the dichroic mirror 71 that is on an optical path of the reflected light. The green (G) light is reflected from the dichroic mirror 71 and illuminates the liquid crystal display 76 that is on an optical path of the reflected green (G) light. The blue (B) light transmits through the dichroic mirror 71 and is reflected from the reflecting mirrors 73 and 74. Thereafter, the blue (B) light illuminates the liquid crystal display 77 that is on an optical path of the reflected blue (B) light.

Each of the liquid crystal displays 75, 76, and 77 forms a projection image of a corresponding color under control of the optical-modulator control unit 52. The cross dichroic prism 78 combines optical paths for the projection images. A multiple-color projection image produced by the combining is projected by the projection optical unit 40 onto a screen Sc in an enlarged manner.

Also in the 3LCD projector 1A configured as described above, temperature rise of the optical components of the projection optical unit 40 can be suppressed by, for example, reducing light power of the green (G) light and the blue (B) light guided to the projection optical unit 40 from the liquid crystal display 76 or 77 under control of the optical-modulator control unit 52, to change the picture mode. The picture mode also can be changed by changing lamp waveform of the light source 21 on a per-color-of-light basis.

The projector 1A is also capable of selecting an optimum one of the above-described cooling processes, which are the cooling process by changing the picture mode described above, the cooling process by controlling rotation of the cooling fans 17, and the cooling process by controlling electric power supplied to the light source 21, depending on the outside air temperature or the like. The projector 1A is also capable of performing two or more of the cooling processes in a combined manner depending on the outside air temperature or the like and, furthermore, performing the cooling processes in an order that depends on the outside air temperature or the like. As described above, the projector 1A of the fifth embodiment can suppress temperature rise of the optical components of the optical engine unit 10A while maintaining brightness of a projection image, thereby achieving projection with high image quality as well.

Although the high-pressure mercury lamp is used as the light source 21 in each of the embodiments, the present invention is not limited thereto, and a semiconductor light source, such as an LED and an LD, can alternatively be used. Also in this case, as in the case where the high-pressure mercury lamp is used, the picture mode can be changed by controlling, using the optical modulator 33, light power of projection light guided to the projection optical unit 40 or by controlling the amount of light emitted from the semiconductor light source. When a light source array is used, the picture mode can be changed by controlling the number of light sources that are turned on to change light power of each color. The cooling process by controlling electric power supplied to the light source 21 and the cooling process by controlling rotation of the cooling fans 17 can also be combined. According to such control as described above, it becomes possible to suppress temperature rise of the optical engine unit 10 while maintaining brightness of a projection image.

The projector 1, 1A of each of the embodiments may have a high-altitude mode, which is selectable using the operating unit 11 or the like, for use in a highland where the air pressure is low. When the high-altitude mode is selected, cooling control is performed using a cooling control condition that differs from when used in a low-altitude area (the standard mode). This is because, in a high-altitude highland where the air pressure and air's density are low, even when the cooling fans 17 are operated as in the standard mode, there can be a case where sufficient cooling effect cannot be obtained. Operations of the elements of the cooling control device 60 other than the cooling fans 17 in the high-altitude area can also differ from in the low-altitude area.

Accordingly, it will be preferable to adopt a threshold value of the outside air temperature different from the threshold value of the standard mode as the cooling control condition for the high-altitude mode. Regarding the threshold value of the outside air temperature, it is also preferable to perform the cooling processes in an order that differs from in the standard mode by, for example, placing higher priority on the cooling process by changing the picture mode and the cooling process by controlling electric power supplied to the light source 21 than on the cooling process by controlling rotation of the cooling fans 17. With such a cooling control condition, cooling control optimum for a location where the projector 1 is used, which may be the high-altitude area or the low-altitude area, can be performed. As a result, temperature rise of the projector 1 can be suppressed favorably while maintaining image brightness.

According to an embodiment, an image projection apparatus capable of suppressing temperature rises of optical components while maintaining image brightness can be provided.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image projection apparatus configured to project an image onto a projection receiving part, the image projection apparatus comprising:
   a light source;
   an optical modulator configured to form the image using light from the light source;
   a temperature detector configured to detect an environmental temperature; and
   circuitry configured to
      control the light source and the optical modulator, and
      control the optical modulator to adjust color tone of the image depending on the environmental temperature detected by the temperature detector, wherein the optical modulator changes, based on the environmental temperature, a portion of a green period when green light is to be guided to a projection receiving part, to a black period when the green light is not to be guided to the projection receiving part,
      the green period being longer than the black period and being divided into three sub-periods, and
      the black period being a middle sub-period of the three sub-periods.

2. The image projection apparatus according to claim 1, wherein conditions for performing the color tone adjustment of the image, control of electric power supplied to the light source, and control of rotational speed of a cooling fan vary between a case where the environmental temperature is increasing and a case where the environmental temperature is decreasing.

3. The image projection apparatus according to claim 1, wherein conditions for performing the color tone adjustment of the image, control of electric power supplied to the light source, and control of rotational speed of a cooling fan vary between a case where the image projection apparatus is used in a high-altitude area and a case where the image projection apparatus is used in a low-altitude area.

4. The image projection apparatus according to claim 1, wherein the circuitry is further configured to perform a sequential projection temperature adjustment, the sequential adjustment including
   performing the color tone adjustment of the image,
   control of electric power supplied to the light source, and
   control of rotational speed of a cooling fan,
   wherein a sequence order of the sequential adjustment is based on a first detected temperature threshold, a second detected temperature threshold, and a third detected temperature threshold.

* * * * *